United States Patent
Andre et al.

(10) Patent No.: US 7,041,955 B2
(45) Date of Patent: May 9, 2006

(54) METHOD FOR CONTROLLING A PHOTOSENSITIVE DEVICE INCLUDING A READ PHASE AND A CALIBRATION PHASE

(75) Inventors: Patrice Andre, Grenoble (FR); Robert Neyret, Coublevie (FR); Bruno Bosset, Coublevie (FR); Clément Atoyan, Grenoble (FR)

(73) Assignee: Trixell S.A.S., Moirans (FR)

( * ) Notice: Subject to any disclaimer, the term of this patent is extended or adjusted under 35 U.S.C. 154(b) by 187 days.

(21) Appl. No.: 10/480,799

(22) PCT Filed: Jun. 7, 2002

(86) PCT No.: PCT/FR02/01965

§ 371 (c)(1),
(2), (4) Date: Dec. 19, 2003

(87) PCT Pub. No.: WO02/104006

PCT Pub. Date: Dec. 27, 2002

(65) Prior Publication Data
US 2005/0173620 A1  Aug. 11, 2005

(30) Foreign Application Priority Data
Jun. 19, 2001 (FR) .................................. 01 08038

(51) Int. Cl.
*H01L 27/00* (2006.01)
(52) U.S. Cl. .................................... 250/208.1; 348/187
(58) Field of Classification Search ............ 250/208.1; 348/302–310, 180, 187–189
See application file for complete search history.

(56) References Cited

U.S. PATENT DOCUMENTS

| 5,278,658 A | | 1/1994 | Takase |
| 5,925,875 A | * | 7/1999 | Frey ......................... 250/208.1 |
| 5,925,880 A | * | 7/1999 | Young et al. ............ 250/252.1 |
| 6,101,287 A | | 8/2000 | Corum et al. |

OTHER PUBLICATIONS

U.S. Appl. No. 10/416,894, filed Nov. 16, 2001.
U.S. Appl. No. 09/926,834, filed Dec. 28, 2001, Ducourant et al.
U.S. Appl. No. 10/480,799, filed Dec. 19, 2003, Andre et al.

* cited by examiner

*Primary Examiner*—Stephone B. Allen
*Assistant Examiner*—Patrick J. Lee
(74) *Attorney, Agent, or Firm*—Oblon, Spivak, McClelland, Maier & Neustadt, P.C.

(57) ABSTRACT

A method of driving a photosensitive device including a matrix of photosensitive pixels of the type produced in particular by techniques for depositing semiconductor materials. The method may be particularly directed to the driving of such devices used for radiological image detection. The method subjects the photosensitive pixel during a read phase to a cycle of successive images including a useful image preceded by at least one offset image taken at an initial instant. A correction is applied to the useful image, the correction being based on the offset image taken at the initial instant and based on the time separating the useful image from the offset image taken at the initial instant.

10 Claims, 5 Drawing Sheets

METHOD FOR CONTROLLING A PHOTOSENSITIVE DEVICE INCLUDING A READ PHASE AND A CALIBRATION PHASE

The present invention relates to a method of driving a photosensitive device comprising a matrix of photosensitive pixels of the type produced in particular by techniques for depositing semiconductor materials. The invention relates more particularly (but not exclusively) to the driving of such devices used for radiological image detection.

Techniques for the thin-film deposition of semiconductor materials, such as hydrogenated amorphous silicon (a-SiH), on insulating, for example glass, supports are used to produce matrices of photosensitive pixels that can produce an image from visible or near-visible radiation. To use these matrices for the detection of radiological images, all that is required is to interpose, between the X-radiation and the matrix, a scintillator screen that converts the X-radiation into light radiation within the band of wavelength at which the photosensitive pixels are sensitive.

The photosensitive pixels that form these matrices generally comprise a photosensitive element associated with an element providing a switch function. The photosensitive area is mounted between a row conductor and a column conductor. Depending on the requirements, the photosensitive device then comprises a plurality of photosensitive pixels arranged as a matrix or as a linear array.

The photosensitive element usually consists of a diode connected in series with the switch element. The switch element may, for example, be a switching diode whose "closed" or "on" state corresponds to the bias that drives it into forward conduction and whose "open" or "off" state corresponds to its reverse bias. The two diodes are connected with opposed conduction directions in a configuration called "back-to-back". Such an arrangement is well known, for example from French patent application 86/14058 (publication No. 2 605 166) which describes a matrix of photosensitive pixels of the type with two diodes in a "back-to-back" configuration, a method of reading the photosensitive pixels and a way of producing such a photosensitive device. The amorphous semiconductor material produces persistence. This is due to its amorphous structure, which includes a large number of traps, much more than in crystalline materials. These traps are structure defects which extend over the entire band gap. They retain charges generated during image acquisition. The material stores an image corresponding to a given irradiation and restores the charges relating to this image while the following image is being read, or even while several following images are being read. The quality of the images is thereby degraded.

A defect affects image quality. The semiconductor components used in such photosensitive devices are not all identical and the photosensitive device inherently possesses inhomogeneities which are manifested by impaired regions and which vary over time.

To attempt to obtain a useful image of optimum quality, a correction is applied to the useful image on the basis of what is called an "offset image", also known as "dark image" that is generally acquired and stored at the start of an operating cycle. This offset image is the image obtained when the photosensitive device is exposed to a signal of zero intensity and corresponds to a kind of background image. The offset image varies according to the electrical state of the components of the photosensitive pixels and to the dispersion in their electrical characteristics. The useful image is that read whenever the photosensitive device has been exposed to a useful signal that corresponds to exposure to X-radiation. It includes the offset image. The correction consists in subtracting the offset image from the useful image. This correction is reliable only if the offset image has not varied between the moment when it was taken and the moment when the useful image was taken at the moment when the useful image is taken. The photosensitive pixels must be in the same electrical state just before acquisition of the offset image and before that of the useful image. When not being driven, semiconductor components are permanently seeking an equilibrium state, which can be achieved in a few hours since the time taken to drain the traps of the stored charges extends over time ranges of between a few microseconds and a few minutes, or even a few hours. After this lapse of time, their state may still vary depending on the temperature or on infinitesimal variations in residual irradiation.

Since the offset image is generally taken at the start of an operating cycle of the photosensitive device and the useful image, initiated at the discretion of the radiographer, is taken randomly when the need arises, there is no reason for the semiconductor components to be all in the same state at these two instants, which are separated by a variable time interval.

FIGS. 1a and 1b show symbolically the state of filling of the traps of the components of a photosensitive pixel of a photosensitive device, to which the invention applies, over the course of time. The arrows represent image cycles. The term "image cycle" is understood to mean the sequence formed by an image acquisition phase followed by a read phase and then by an erase and reset phase, as explained in patent application FR-A-2 760 585. During the image acquisition phase, the photosensitive pixels are exposed to a signal to be picked up, whether this signal is a maximum illumination signal or a dark signal; during the read phase, a read pulse is applied to the row conductors addressed for reading the amount of charge stored during the image acquisition. During the erase and reset phase, the photosensitive pixels are erased, generally optically, and reset to a state in which they are receptive to a new image acquisition.

Between two successive image cycles, the photosensitive pixels are left at rest, but their electrical state will change. It will be assumed that the first image cycle shown provides the offset image and the other cycles deliver useful images to be corrected by the offset image.

It may be clearly seen that if the image cycles occur randomly, as in FIG. 1a, since the electrical states of the photosensitive pixel are different at the start of a cycle, the useful images corrected by the offset image cannot be reliable.

By contrast, in FIG. 1b the image cycles occur regularly, for example every five seconds, and at the start of each cycle the electrical state of the photosensitive pixel is substantially the same.

The offset image has not fluctuated and the correction of a useful image taken during a cycle by the offset image taken during another, previous cycle is reliable. The major drawback with this method of operation is that it introduces many constraints since the various cycles must follow one another in a periodic manner in order to obtain the expected result.

This use is very restrictive and is not compatible with the expectations of radiologists who wish to be able to take useful images as and when they require. The aim of the present invention is to avoid this major drawback, while still guaranteeing an image of optimum quality.

For this purpose, the subject of the invention is a method of driving a photosensitive device comprising at least one photosensitive pixel with a photodiode connected to a switching element, consisting in subjecting the photosensitive pixel during a read phase to a cycle of successive images comprising a useful image preceded by at least one offset image produced at an initial instant, characterized in that a correction is applied to the useful image, said correction being based on the offset image taken at the initial instant and based directly on the time separating the useful image from the offset image taken at the initial instant.

The invention will be more clearly understood and other advantages will appear on reading the detailed description of several ways of implementing the invention, given as examples, and embodiments illustrated by the appended drawing in which:

FIGS. 1a and 1b, already described, show the state of the traps of the components of a photosensitive pixel when it is being used according to known methods;

Figure 1A:
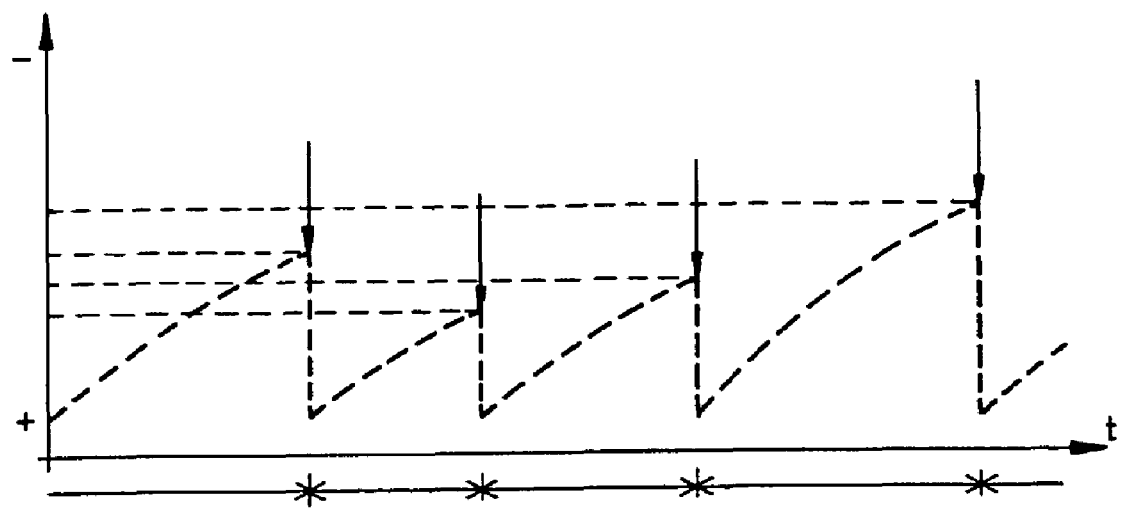
Figure 1B:
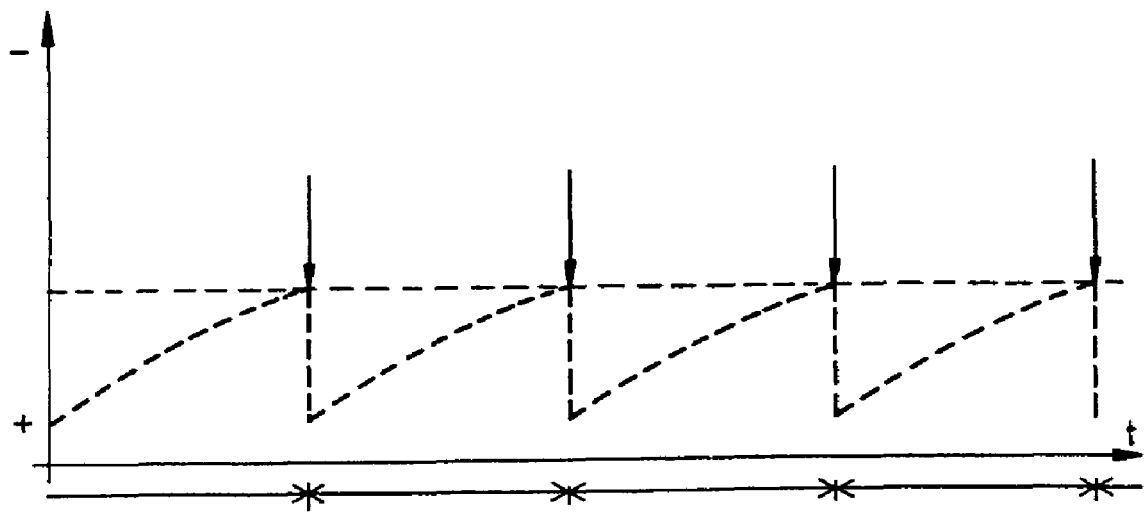
Figure 2:
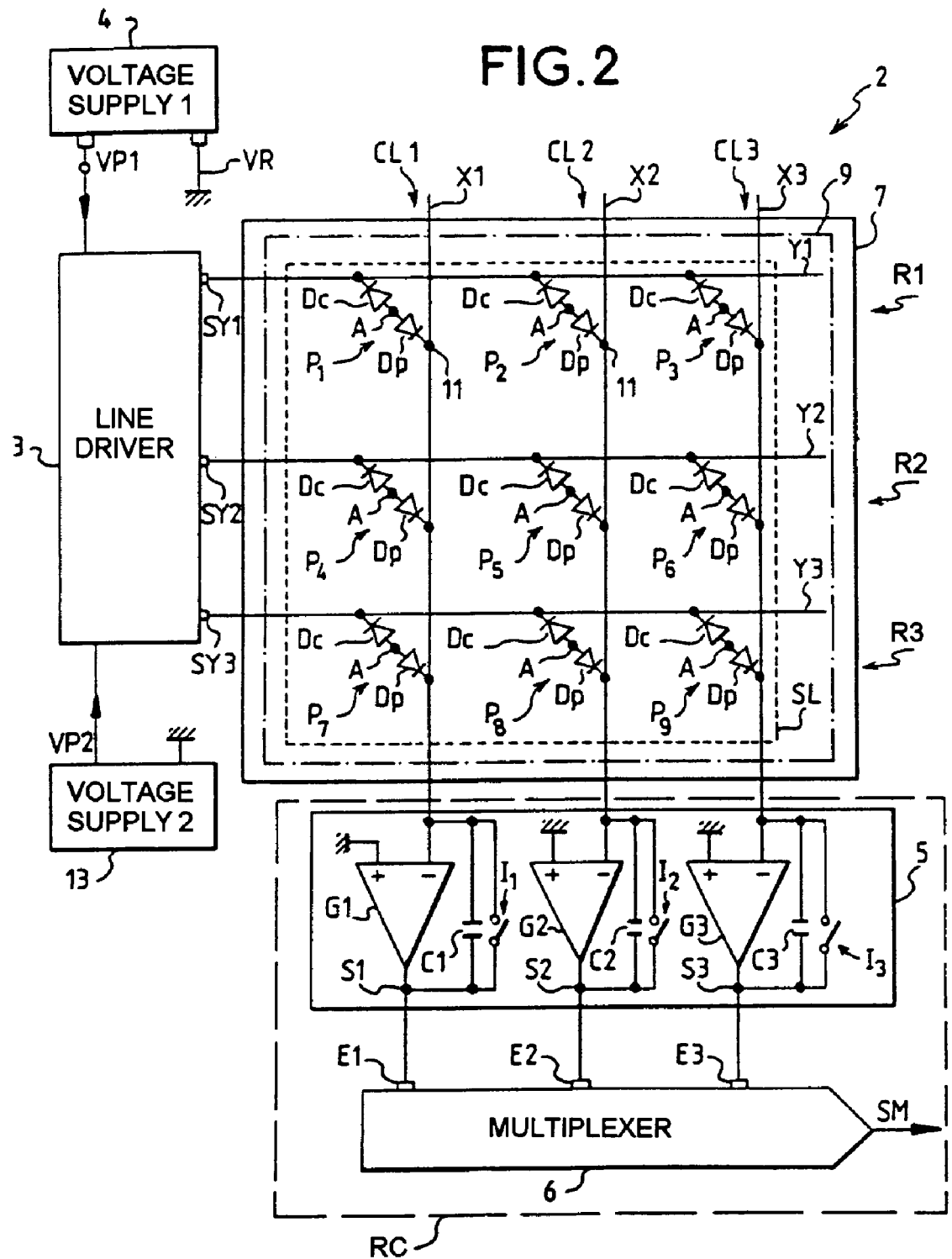
FIGS. 2 and 3 show photosensitive devices to which the invention is applicable.

FIG. 2 shows a simplified diagram of a photosensitive device 1, comprising a matrix 2 organized in a conventional manner. The matrix 2 comprises photosensitive pixels P1 to P9, each formed by a photosensitive diode Dp and a switching diode Dc connected in series in a back-to-back configuration. The matrix includes row conductors Y1 to Y3 intersecting with column conductors X1 to X3, with, at each intersection, a photosensitive pixel connected between a row conductor and a column conductor. The photosensitive pixels P1 to P9 are thus arranged along rows R1 to R3 and columns CL1 to CL3.

In the example of FIG. 2, only three rows and three columns are shown, these defining nine photosensitive pixels, but such a matrix may have a much greater capacity, with possibly up to several million pixels. For example, it is common practice to produce such matrices having photosensitive pixels arranged in 3 000 rows and 3 000 columns (over an area of around 40 cm×40 cm) or else arranged along a single row and several columns, to constitute a linear detection array, or else arranged in a single row and a single column, to constitute a single photosensitive pixel.

The photosensitive device includes a line driver 3, the outputs SY1, SY2, SY3 are connected to the row conductors Y1, Y2, Y3, respectively. The line driver 3 is made up of various elements (not shown) such as, for example, a clock circuit, switching circuits and a shift register, which allow it to address the row conductors Y1 to Y3 sequentially. The photosensitive device furthermore includes a voltage supply 4 that delivers a voltage VP1 to the line driver 3 for defining the amplitude of the bias pulses applied to the row conductors and a voltage supply 13 that delivers a voltage VP2 to the line driver 3 for defining the amplitude of read pulses applied to the row conductors. These two voltage supplies may optionally be one and the same.

In each photosensitive pixel P1 to P9, the two diodes Dp, Dc are connected together either by their cathodes or, as in the example shown, by their anodes. The cathode of the photodiode Dp is connected to a column conductor X1 to X3 and the cathode of the switching diode Dc is connected to a row conductor Y1 to Y3.

In the image acquisition or image-taking phase, that is to say the phase in which the matrix 2 is illuminated by a "useful" light signal, the two diodes Dp, Dc of each photosensitive pixel P1 to P9 are reverse-biased, and in this state they each constitute a capacitor. It should be noted that in general the two diodes Dp, Dc are designed so that the capacitance presented by the photodiode Dp is the higher one (for example around 50 times higher).

When exposed to a useful light signal, charges are generated in the photodiode Dp by the illumination of the photosensitive pixel P1 to P9 to which it belongs. These charges, the number of which depends on the intensity of illumination, build up at a point "A" on the (floating) node formed at the junction between the two diodes Dp, Dc. The photosensitive pixels P1 to P9 are read row by row, simultaneously for all the photosensitive pixels connected to the same row conductor Y1 to Y3. For this purpose, the line driver 3 applies a read pulse of given amplitude to each row conductor Y1 to Y3 addressed; the row conductors that are not addressed are kept at a reference or rest potential Vr, which is ground potential for example, and may be the same potential as that applied to the column conductors X1 to X3.

Any accumulation of charges at the point "A" of a photosensitive pixel P1 to P9 causes a reduction in the voltage at this point, that is to say a reduction in the reverse bias voltage for the photodiode Dp. In certain operating modes, the application of the read pulse to a row conductor Y1 to Y3 has the effect of restoring, to the potential of the point "A" of all the photosensitive pixels connected to this row conductor, the bias level that it had before exposure to the useful light signal: this results in a flow in each of the column conductors X1 to X3 of a current proportional to the charges accumulated at the corresponding point "A".

The column conductors X1 to X3 are connected to a read circuit RC comprising, in the example, an integrator circuit 5 and a multiplexer circuit 6 which is formed, for example, by a shift register with parallel inputs and serial output, possibly of the CCD (Charge Coupled Device) type. Each column conductor is connected to a negative input "−" of an amplifier G1 to G3 connected as an integrator. An integration capacitor C1 to C3 is connected between the negative input "−" and an output S1 to S3 of each amplifier. The second input "+" of each amplifier G1 to G3 is connected to a potential which, in the example, is the reference potential Vr, which potential is consequently imposed on all the column conductors X1 to X3. Each amplifier includes a reset switch element I1 to I3 (formed, for example, by an MOS-type transistor) connected in parallel to each integration capacitor C1 to C3.

The outputs S1 to S3 of the amplifiers are connected to the inputs E1 to E3 of the multiplexer 6. This conventional arrangement makes it possible to deliver, "serially" and row by row (R1 to R3), as output SM from the multiplexer 6, signals corresponding to the charges accumulated at the points "A" of all the photosensitive pixels P1 to P9.

It should be noted that it is also known, in order to fulfill the switch function which, in the example of FIG. 2, is provided by the switching diode Dc, to use a transistor; the latter has, compared with the diode, a greater connection complexity, but it does have advantages in the quality of its "on" state, which advantages will be explained in the rest of the description.

Figure 3:
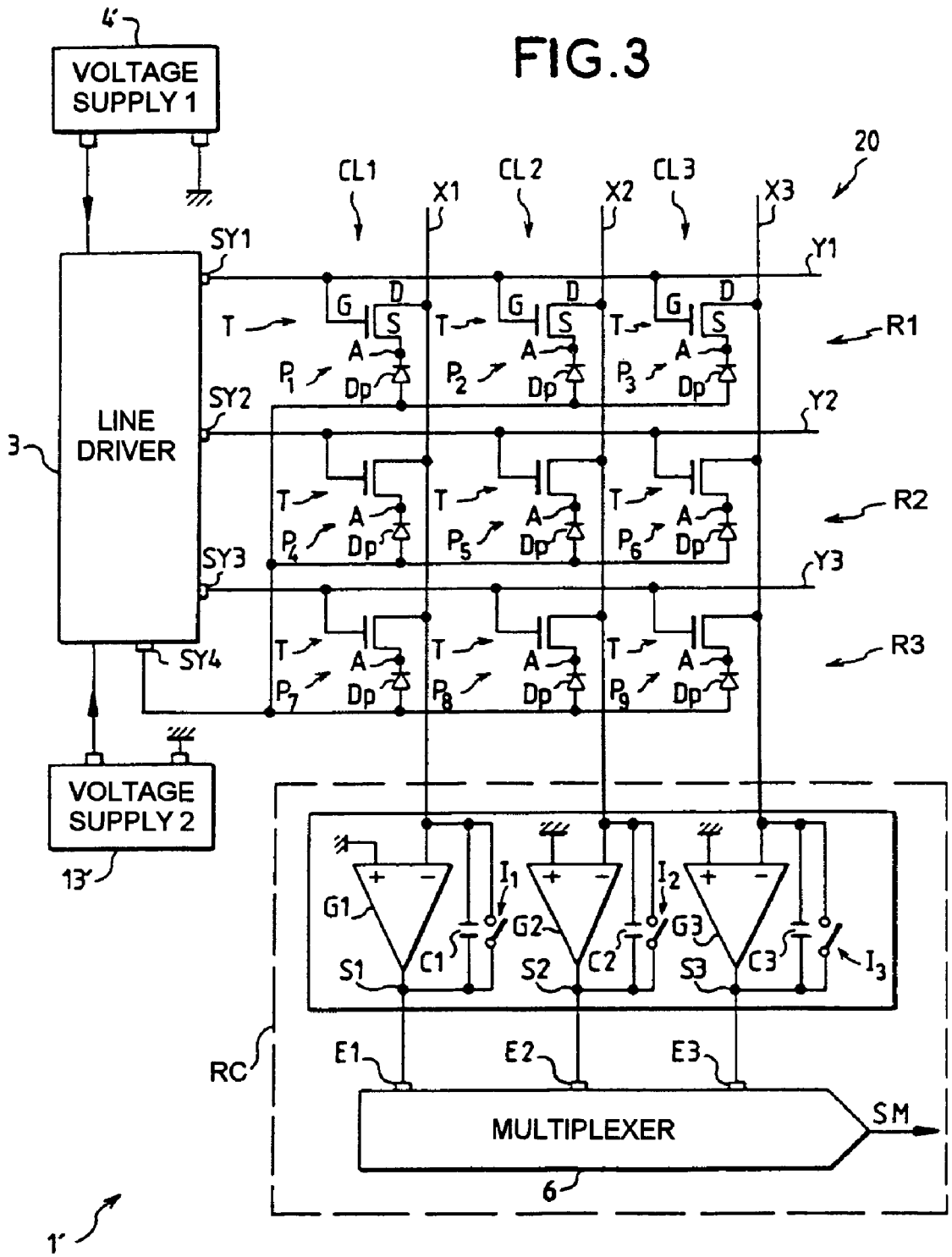

FIG. 3 illustrates schematically a photosensitive device 1' that differs from that of FIG. 2 mainly in that it comprises a matrix 20 in which the switching diodes Dc are replaced with transistors T, for example produced by thin-film deposition techniques. These techniques are known as TFT (Thin Film Transistor) techniques. These techniques may also be used to produce the matrix 2 shown in FIG. 2.

In the diagram shown in FIG. 3 as an example, the transistor T in each photosensitive pixel P1 to P9 is connected by its source S to the cathode of the photodiode Dp, that is to say at the point "A", its gate G is connected to the row conductor Y1 to Y3 to which the photosensitive pixel belongs and its drain D is connected to the column conductor X1 to X3 to which the photosensitive pixel belongs. The anodes of all the photodiodes Dp are joined together and connected to an output SY4 of the line driver 3. The output SY4 delivers a bias voltage $V_{bias}$, negative relative to the reference potential Vr or ground potential, around −5 volts for example, which serves to reverse-bias the photodiodes Dp; the line driver 3 receives, for example, this bias voltage from a supply 4'.

For a greater understanding of the operation of the devices shown in FIGS. 2 and 3, reference may be made to the French patent application published under No. FR 2 760 585.

More precisely, to improve the offset correction, the devices described above may operate as follows.

During a read phase, the photosensitive device is subjected to a cycle of successive images comprising a useful image preceded by at least one offset image taken at an initial instant. According to the invention, a correction is applied to the useful image, said correction being based on the offset image taken at the initial instant and on the time separating the useful image from the offset image taken at the initial instant.

A usable time interval, during which the useful image will have to occur, is defined. The start of the usable time interval corresponds to the end of acquisition of the offset image (acquired as background task by the system). The end of the usable time interval corresponds to the start of the acquisition of the next offset image. If an operator wishes to take a useful image after the end of the usable time interval, he must therefore wait until a new offset has been taken. The end of acquisition of this new offset image marks the start of a new usable time interval.

Figure 4:
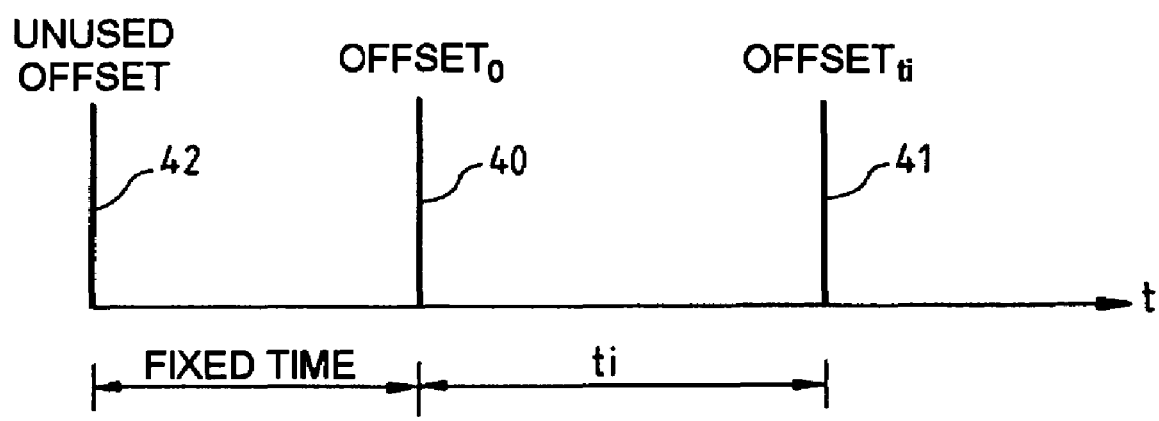
FIG. 4 shows, in the form of a timing diagram, an example of concatenation of several offset images in calibration phase.

More precisely, the correction based on time, this correction being defined above, is generated during a calibration phase generally carried out during the manufacture of the photosensitive device. The calibration phase precedes the read phase during which the offset image taken at the initial instant and the useful image occur. During the calibration phase, several pairs of offset images are taken. The two offset images of each pair are separated by a given time ti. Two images of a pair are shown in the timing diagram of FIG. 4. The first image, called offset $_0$ is denoted by 40 and the second image called offset $_{ti}$ is denoted by 41. Times ti distributed over a time interval identical to the usable time interval, employed in read phase, are chosen for the various offset image pairs. For each offset image pair, the difference between the second offset image 41 and the first offset image 40 is determined and then stored. The stored differences are indexed with the aid of the corresponding time ti.

In read phase, a current offset image, based on the offset image taken at the initial instant and on the stored difference corresponding substantially to the time separating the useful image from the offset image taken at the initial instant, is subtracted from the useful image. More precisely, if by convention the stored difference is chosen to be equal to the first offset image 40 from which the second offset image 41 is subtracted, the current offset image is then approximately equal to the offset image taken at an initial instant from which the stored difference has been subtracted.

Alternatively, in calibration phase, it is possible to store simply the second image 41 of each pair. Then, in read phase, the second offset image 41 is subtracted from a pair corresponding approximately to the time ti separating the useful image from the offset image taken at an initial instant.

Advantageously, to improve the quality of the stored differences, an unused offset image 42 is taken in calibration phase for each pair. This image 42 precedes the first image 40 and an approximately fixed time separates the unused offset image 42 from the first offset image 40. Advantageously, the approximately fixed time is equal to the time separating the two offset images taken in read phase. In certain applications, the approximately fixed time of the read phase may be different (generally longer) than that of the calibration phase.

In the calibration phase, for each offset image pair, the stored difference may be determined for each photosensitive pixel of the device. This makes it possible to take into account the temporal differences in relaxation of the traps that may exist between the various photosensitive pixels. By contrast, this has the drawback of adding noise to the correction made to the current offset image.

In calibration phase, it is also possible to store an overall difference for the entire device. This difference between the second offset image 41 and the first offset image 40 is then determined on the basis of the mean level of each image making up the pair of offset images. This does not generate noise in the correction applied to the current offset image, but it does not take into account any variations between the various photosensitive pixels of the device.

In calibration phase, for each offset image pair, the stored difference may also be determined on the basis of the mean level of parts of each offset image. This variant is useful, for example, when the photosensitive pixels are produced on several separate substrates joined edge to edge to form the matrix 2.

It is known that offset images may vary with temperature. It is therefore possible to apply a correction to the useful image that depends on the temperature at which the useful image was taken. More precisely, differences as defined above may be stored with a double indexation—the first one depending on the time ti and the second one depending on the temperature.

Figure 5:
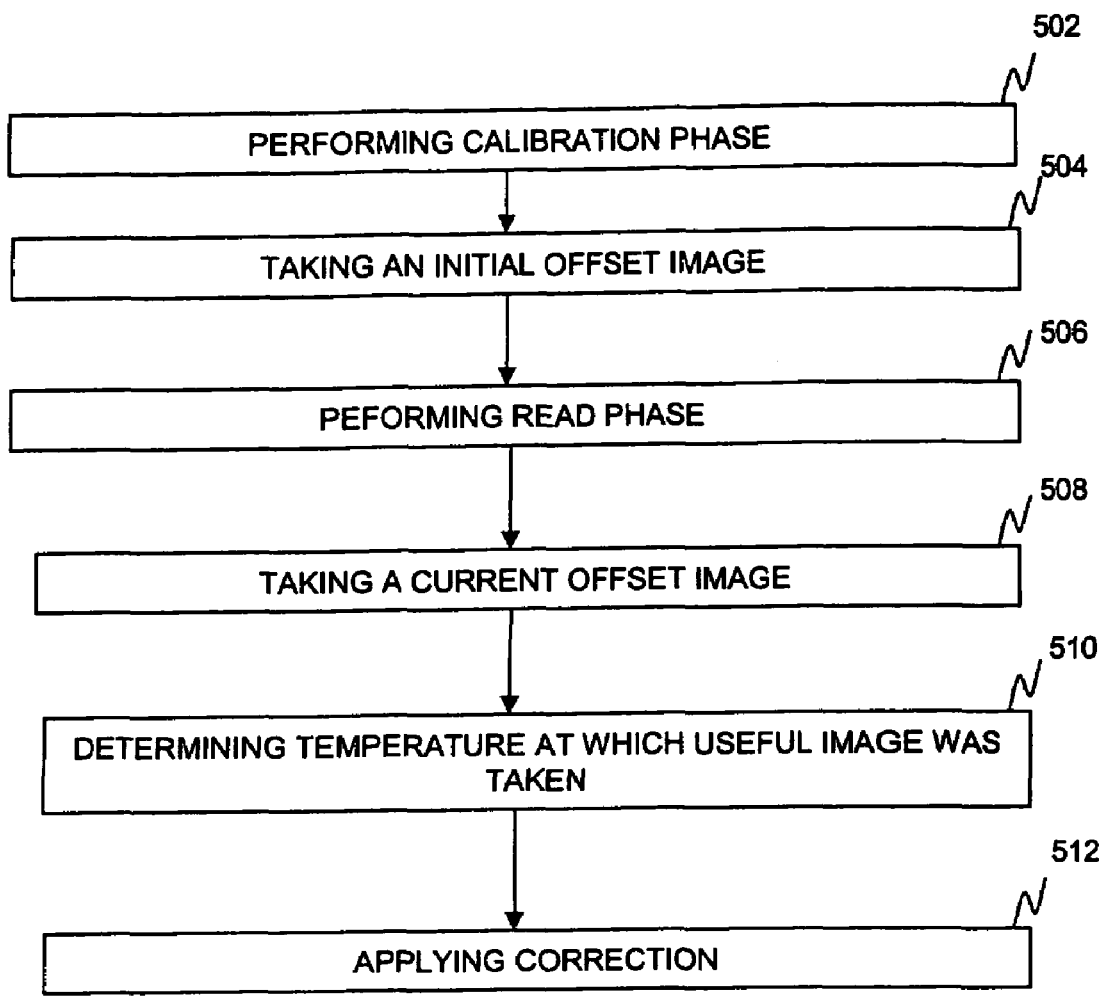
FIG. 5 shows a method for driving a photosensitive device.

FIG. 5 shows, for a non-limiting embodiment of the present invention, a method for driving a photosensitive device. In step 502, the calibration phase is performed. In step 504, an initial offset image is taken. In step, 506, the read phase is performed. In step 508, a current offset image is taken. In step 510, the temperature at which the useful image was taken is determined. In step 512, a correction is applied.

As a variant, it is possible to dispense with an actual calibration phase and produce the offset ti image after the useful image. This variant may be employed by carrying out, after the useful image, a cycle comprising an offset $_0$ image 40 followed by an offset $_{ti}$ image 41. The images 40 and 41 are then separated by a time of approximately ti. A simpler and more rapid procedure may be to be content with taking an offset $_{ti}$ image separated from the useful image by the time ti.

The invention claimed is:

1. A method of driving a photosensitive device including at least one photosensitive pixel with a photodiode connected to a switching element, comprising:

subjecting the photosensitive pixel during a read phase to a cycle of successive images including a useful image preceded by at least one offset image produced at an initial instant; and applying a correction established during a calibration phase to the useful image, the correction being based on the offset image taken at the initial instant and on an amount of time separating the useful image from the offset image taken at the initial instant, and wherein the calibration phase precedes the read phase.

2. The method as claimed in claim 1, wherein, in the calibration phase, the method comprises taking plural pairs of offset images, two images of each pair being separated by a given time, the given times of the plural pairs being distributed within a usable time interval in the read phase, determining and then storing the difference between the second offset image and the first offset image of each pair, and then in the read phase subtracting a current offset image from the useful image, the current offset image depending on the offset image taken at the initial instant and on the stored difference corresponding approximately to the time separating the useful image from the offset image taken at the initial instant.

3. The method as claimed in claim 1, wherein, in the calibration phase, the method comprises taking plural pairs of offset images, two images of each pair being separated by a given time, the given times of the plural pairs being distributed within a usable time interval in the read phase, storing the second offset image of each pair, and then, in the read phase, subtracting the second offset image from a pair corresponding approximately to the time separating the useful image from the offset image taken at the initial instant.

4. The method as claimed in claim 2, wherein the current offset image is approximately equal to the offset image taken at the initial instant, from which is subtracted the stored difference conventionally chosen as being equal to the first offset image from which the second offset image is subtracted.

5. The method as claimed in claim 2, wherein, in the calibration phase, each offset image pair is preceded by an unused offset image and wherein, for all of the pairs, an approximately fixed time separates the unused offset image from the first offset image of the pair in question.

6. The method as claimed in claim 2, wherein, in the calibration phase, the difference between the second offset image and the first offset image is determined for each photosensitive pixel.

7. The method as claimed in claim 2, wherein, in the calibration phase, the difference between the second offset image and the first offset image is determined based on a mean level of each offset image.

8. The method as claimed in claim 2, wherein, in the calibration phase, the difference between the second offset image and the first offset image is determined based on a mean level of parts of each offset image.

9. The method as claimed in claim 1, further comprising taking a current offset image after the useful image and separated by a time from the useful image, the time corresponding to the time separating the useful image from the offset image taken at the initial instant, and then subtracting a current offset image from the useful image.

10. The method as claimed in claim 1, further comprising:
determining a temperature at which the useful image is taken,
wherein a correction is applied to the useful image, said correction depending on a temperature at which the useful image is taken.

* * * * *